(12) United States Patent
Prather

(10) Patent No.: US 8,661,798 B2
(45) Date of Patent: Mar. 4, 2014

(54) AIR ENTRAINMENT COMPONENT FOR VEHICLE EXHAUST SYSTEM

(75) Inventor: David M. Prather, Columbus, IN (US)

(73) Assignee: Faurecia Emissions Control Technologies, Columbus, IN (US)

( * ) Notice: Subject to any disclaimer, the term of this patent is extended or adjusted under 35 U.S.C. 154(b) by 529 days.

(21) Appl. No.: 12/891,843

(22) Filed: Sep. 28, 2010

(65) Prior Publication Data
US 2012/0073271 A1    Mar. 29, 2012

(51) Int. Cl.
F01N 3/05 (2006.01)

(52) U.S. Cl.
USPC .......................................................... 60/317

(58) Field of Classification Search
USPC .................. 60/298, 304, 317, 319, 324, 320; 285/302, 13
See application file for complete search history.

(56) References Cited

U.S. PATENT DOCUMENTS

| 3,107,484 | A | * | 10/1963 | Touhey | 60/280 |
| 4,142,606 | A |   | 3/1979  | Vanderzanden et al. | |
| 5,058,703 | A | * | 10/1991 | Ealba et al. | 181/228 |
| 6,832,665 | B2 |  | 12/2004 | Crombeen | |
| 7,628,012 | B2 | * | 12/2009 | Eifert et al. | 60/319 |
| 2008/0092533 | A1 | * | 4/2008 | Tennison | 60/317 |
| 2010/0107616 | A1 | * | 5/2010 | Janakiraman et al. | 60/317 |

* cited by examiner

Primary Examiner — Kenneth Bomberg
Assistant Examiner — Jonathan Matthias
(74) Attorney, Agent, or Firm — Pamela A. Kachur

(57) ABSTRACT

A vehicle exhaust system includes an air entrainment component that is used to reduce exhaust gas temperatures exiting the vehicle exhaust system. The air entrainment component includes an exhaust pipe with a non-circular cross-section at one end and an overlap tube that substantially surrounds the non-circular cross-section to form an air gap between the exhaust pipe and the overlap tube. Cooling external air is drawn into the air gap to cool heated exhaust gases within the exhaust pipe.

26 Claims, 3 Drawing Sheets

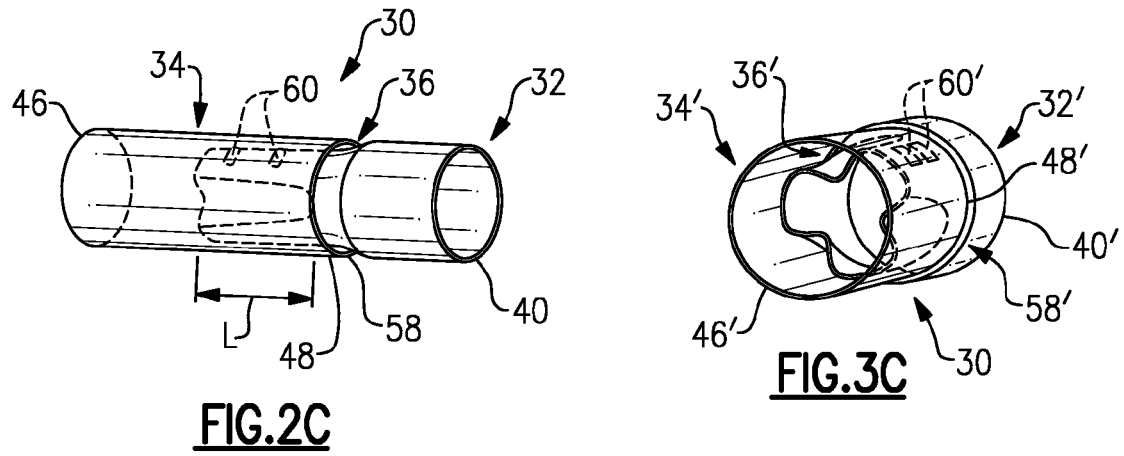
FIG.2C
FIG.3C
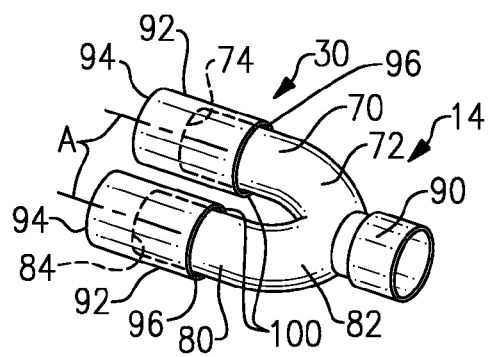
FIG.4A
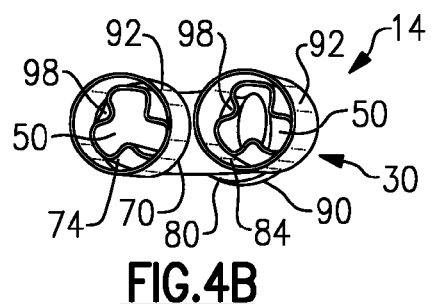
FIG.4B

AIR ENTRAINMENT COMPONENT FOR VEHICLE EXHAUST SYSTEM

TECHNICAL FIELD

This invention generally relates to an air entrainment component that is used to reduce exhaust gas temperatures exiting a vehicle exhaust system.

BACKGROUND OF THE INVENTION

An exhaust system is comprised of several types of components such as converters, particulate filters, mufflers, resonators, etc. These components are positioned downstream of a vehicle engine and upstream of an exhaust gas outlet to atmosphere via a tailpipe. A series of exhaust pipes or exhaust tubes are used to connect these components to each other such that exhaust gases are directed from the engine, through the various components, and then exit the system via the tailpipe.

Typically, the exhaust system includes a filter component that collects particulates prior to exiting from a tailpipe. A filter's particulate trap is "cleaned," or "regenerated," by way of a particulate trap burn-out sequence. Essentially, in such a burn-out sequence, the filter is heated to a temperature where the particulates collected within the filter combust. While effective at cleaning the filter, this sequence can result in significantly high exhaust gas temperatures exiting the tailpipe, which are undesirable.

One proposed design has cut tabs in the tailpipe and has bent these tabs into the exhaust gas flow path. An overlap pipe covering surrounds the tailpipe where the tabs have been cut. The tabs generate an undesirable air rush along with a higher back pressure, and the overlap pipe covering creates packaging issues.

Another proposed design connects two pipes of different diameters together with a rod. This design is aesthetically unappealing and has limited positioning capability. The venturi in this configuration is open to the atmosphere and therefore can only be located in the tailpipe, i.e. this configuration cannot be used in a forward location within the exhaust system.

SUMMARY OF THE INVENTION

A vehicle exhaust system includes an air entrainment component that is used to reduce exhaust gas temperatures exiting the vehicle exhaust system. The air entrainment component includes an exhaust pipe with a non-circular cross-section at one end and an overlap tube that substantially surrounds the non-circular cross-section to form an air gap between the exhaust pipe and the overlap tube that draws cooling external air to cool heated exhaust gases within the exhaust pipe.

In one example, the exhaust pipe extends between first and second pipe ends to form an exhaust gas pathway. The first pipe end is connected to an upstream exhaust component and the second pipe end has the non-circular cross-section that extends along a pre-defined pipe length. The overlap tube has a first tube end extending in a downstream direction and a second tube end that substantially overlaps the second pipe end along the pre-defined pipe length to form at least one air gap between the exhaust pipe and overlap tube.

In one example, the upstream exhaust component comprises a diesel particulate filter that is regenerated to burn off collected particulate matter.

In one example, the non-circular cross-section comprises a fluted section. The fluted section can comprise a continuous, uninterrupted surface or can include openings into the exhaust gas pathway.

In one example, the exhaust pipe and overlap tube form a primary air entrainment assembly and the exhaust system includes an additional air entrainment assembly. The additional air entrainment assembly includes a tailpipe and another overlap tube. The tail pipe includes one end with a non-circular cross-section extending along a predefined tailpipe length. The additional overlap tube substantially surrounds the tailpipe along the predefined tailpipe length.

These and other features of the present invention can be best understood from the following specification and drawings, the following of which is a brief description.

BRIEF DESCRIPTION OF THE DRAWINGS

FIG. 2C is a perspective side view of the exhaust pipe of FIG. 2A in combination with an overlap tube.

FIG. 3C is a perspective side view of the exhaust pipe of FIG. 3A in combination with an overlap tube.

FIG. 4A is a perspective side view of another example of an air entrainment component including a tailpipe in combination with an overlap tube.

FIG. 4B is a perspective end view of the tailpipe and overlap tube of FIG. 4A.

DETAILED DESCRIPTION OF THE PREFERRED EMBODIMENT

Figure 1:
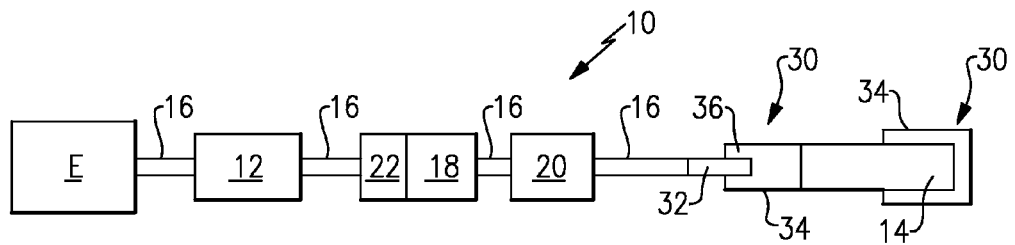
FIG. 1 is a schematic view of a vehicle exhaust system with an air entrainment component.

A vehicle exhaust system 10 is comprised of any of various combinations of different types of exhaust components such as converters, mufflers, resonators, exhaust pipes, etc., which are generally shown at 12. These components 12 are positioned downstream of a vehicle engine E and upstream of an exhaust gas outlet to atmosphere via a tailpipe 14. A series of exhaust pipes or exhaust tubes 16 are used to connect these components to each other such that exhaust gases are directed from the engine E, through the various components 12, and then exit the system via the tailpipe 14.

In one example vehicle exhaust system, a diesel particulate filter (DPF) 18 is used to collect particulate matter and prevent such matter from entering any downstream exhaust components, shown generally at 20. As the DPF 18 collects particulate matter over time, the DPF can become clogged, which adversely effects engine performance. Once it is determined that the DPF 18 has reached this state, the DPF 18 is "cleaned," or "regenerated," by way of a particulate trap burn-out sequence. Essentially, in such a burn-out sequence, the DPF 18 is heated to a temperature where the particulates collected within the filter combust and burn away. Heating the DPF 18 to a sufficient temperature for regeneration can be accomplished passively and/or actively and can use a burner 22, if needed.

While not always required, in certain exhaust system configurations a burner is activated to increase exhaust gas temperatures to a level where the particulate matter can be burned off. The burner 22 can be located in any of various locations within the exhaust system 10, with the position shown in FIG. 1 merely being one example location. Typically, a burner 22 includes a fuel/air mixture supply that is sprayed or injected into the exhaust gas stream and is ignited by an igniter.

Regenerating the DPF 18 is an effective cleaning process; however, this sequence can result in significantly high exhaust gas temperatures exiting the tailpipe 14, which are undesirable because the heat may damage components or objects located near the tailpipe. The vehicle exhaust system includes at least one an air entrainment component 30 that is used to reduce exhaust gas temperatures exiting the vehicle exhaust system 10. The air entrainment component 30 is located downstream of the DPF 18. Further, another air entrainment component 30 can optionally be included at the tailpipe 14, if needed.

The air entrainment component 30 includes an exhaust pipe 32 with a non-circular cross-section at one end and an overlap tube 34 that substantially surrounds the non-circular cross-section to form an air gap 36 between the exhaust pipe 32 and the overlap tube 34. In the example shown, a pipe end opposite the end having the non-circular cross-section has a circular cross-section; however, other cross-sectional shapes could also be used. Cooling external air is drawn into the air gap 36 between the exhaust pipe 32 and overlap tube 34 to cool the heated exhaust gases flowing within the exhaust pipe 32. Examples of exhaust pipes 32 having a non-circular cross-section are shown in FIGS. 2A-3C.

Figure 2A:
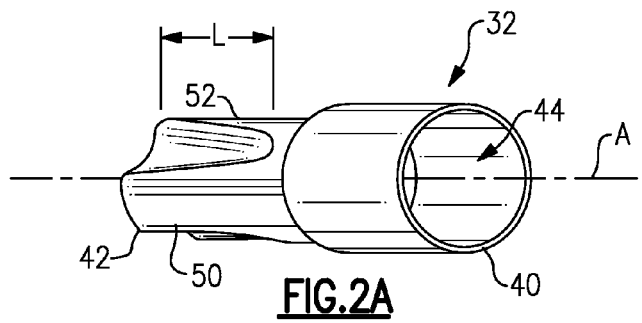
FIG. 2A is a perspective side view of one example of an exhaust pipe of the air entrainment component.
Figure 2B:
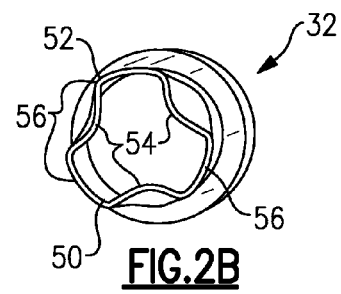
FIG. 2B is a perspective end view of the exhaust pipe of FIG. 2A.

In one example shown in FIGS. 2A-2C, the exhaust pipe 32 extends between first 40 and second 42 pipe ends to form an exhaust gas pathway 44 extending along a central axis A. The first pipe end 40 is connected to an upstream exhaust component 12 or pipe 16 and the second pipe end 42 has the non-circular cross-section that extends along a pre-defined pipe length L. The overlap tube 34 (FIG. 2C) has a first tube end 46 extending in a downstream direction and a second tube end 48 that substantially overlaps the second pipe end 42 along the pre-defined pipe length L to form the air gap 36 between the exhaust pipe 32 and overlap tube 34.

In FIGS. 2A-2C, the non-circular cross-section comprises a scalloped fluted section 50. The fluted section 50 includes an external surface 52 that extends about a periphery of the second pipe end 42. The external surface 52 includes grooved surface portions 54 that extend inwardly toward the axis A and extension portions 56 that extend outwardly away from the axis A. The grooved surface portions 54 and extension portions 56 are spaced circumferentially about the axis A and alternate with one another to form the fluted section 50. The external surface 52 comprises a continuous, uninterrupted surface that extends about the axis A, and which is surrounded by external atmosphere such that the overlap pipe 34 provides an outermost surface of the air entrainment component 30.

As shown in FIG. 2C, the second tube end 48 is positioned in an overlapping relationship to the second pipe end 42 to form the air gap 36. The second tube end 48 has an inner diameter that is greater than an outer diameter of the exhaust pipe 32 at the second pipe end 42 such that external air is drawn in through an inlet 58 and into the air gap 36.

In one example, the overlap tube 34 includes a plurality of openings 60 to receive fasteners (not shown) to secure the overlap tube 34 to the exhaust pipe 32 near the second pipe end 42. The openings 60 are located in alignment with the extension portions 56 to facilitate attachment. The first tube end 46 can then be attached to a downstream exhaust component, or if the exhaust pipe 32 comprises a tailpipe, the first tube end 46 may not be attached to another exhaust component.

As hot exhaust gas flows through and over the fluted section 50, a low pressure zone or region is created just downstream of where the fluted section 50 terminates. This low pressure region siphons/draws external ambient air into the overlap pipe 34 via the inlet 58. The external ambient air mixes with the exhaust gases, thus reducing the overall exhaust gas temperature before exiting the tailpipe 14.

Figure 3A:
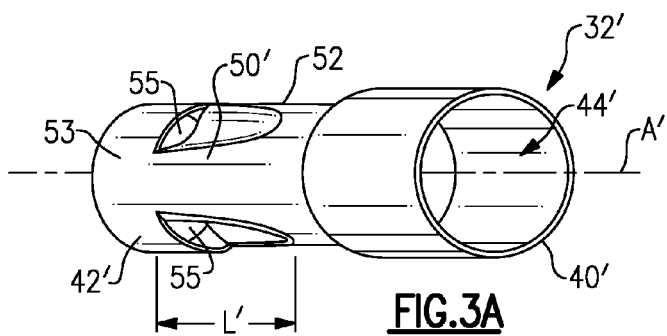
FIG. 3A is a perspective side view of another example of an exhaust pipe of the air entrainment component.
Figure 3B:
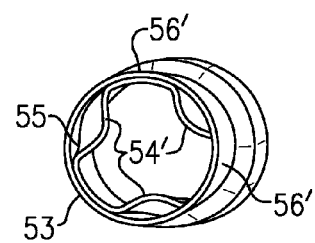
FIG. 3B is a perspective end view of the exhaust pipe of FIG. 3A.

In another example shown in FIGS. 3A-3C, the exhaust pipe 32' extends between first 40' and second 42' pipe ends to form an exhaust gas pathway 44' extending along a central axis A'. The first pipe end 40' is connected to an upstream exhaust component 12 or pipe 16 and the second pipe end 42' has the non-circular cross-section that extends along a pre-defined pipe length L'. The overlap tube 34' has a first tube end 46' extending in a downstream direction and a second tube end 48' that substantially overlaps the second pipe end 42' along the pre-defined pipe length L' to form an air gap 36' between the exhaust pipe 32' and overlap tube 34'.

In FIGS. 3A-3C, the non-circular cross-section comprises a scalloped fluted section 50'. The fluted section 50' includes an external surface 52' that extends about a periphery of the second pipe end 42'. The external surface 52' includes grooved surface portions 54' that extend inwardly toward the axis A' and extension portions 56' that extend outwardly away from the axis A'. The grooved surface portions 54' and extension portions 56' are spaced circumferentially about the axis and alternate with one another to form the fluted section 50'. An additional pipe portion 53 at the second pipe end 42' extends downstream of the fluted section 50'. This additional pipe portion 53 has a diameter that corresponds generally to a diameter that defines an outer surface of the extension portions 56'. The external surface 52' at the fluted section 50' includes openings 55 that are open to the exhaust gas pathway 44' within the exhaust tube 32'. The openings 55 are located at the grooved surface portions 54'. The external surface 52' is surrounded by external/ambient air such that the overlap pipe 34' provides an outermost surface of the air entrainment component 30.

As shown in FIG. 3C, the second tube end 48' is positioned in an overlapping relationship to the second pipe end 42' to form the air gap 36'. The additional pipe portion 53 is not shown for purposes of clarity. The second tube end 48' has an inner diameter that is greater than an outer diameter of the exhaust pipe 32' at the second pipe end 42' such that external air is drawn in through an inlet 58' and into the air gap 36'.

The overlap tube 34' includes a plurality of openings 60' to receive fasteners to secure the overlap tube 34' to the exhaust pipe 32' near the second pipe end 42'. The openings 60' are located in alignment with the extension portions 56' to facilitate attachment. It should be understood that while a fastener connection interface is shown for securing the exhaust pipe to the overlap tube, other attachment methods could also be used.

As hot exhaust gas flows through and over the fluted section 50', a low pressure region is created which draws external ambient air into the overlap pipe 34' as described above.

In each configuration, the scalloped flutes are configured to have a gradual taper. As such, there is little contribution by these flutes to back pressure or to generating an air rush.

Figure 5:
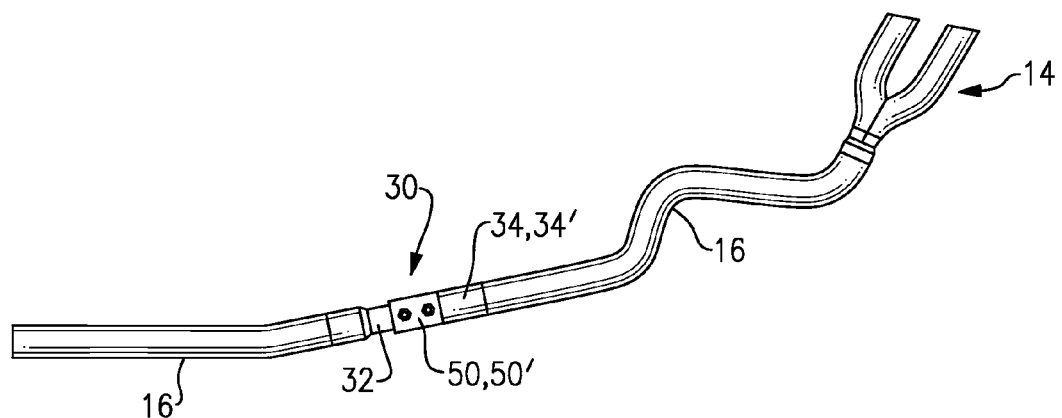
FIG. 5 is a schematic view of one example of a primary air entrainment component as used in a vehicle exhaust system.
Figure 6:
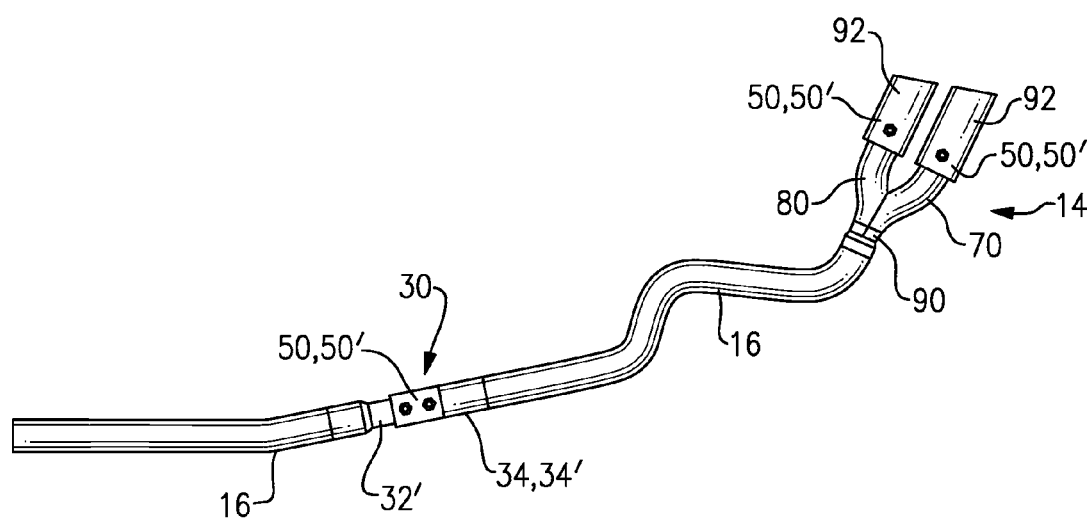
FIG. 6 is a schematic view of example of a primary air entrainment component and at least one additional air entrainment component as used in a vehicle exhaust system.

In one example configuration, the air entrainment components 30 shown in FIGS. 2A-2C and 3A-3C are primary entrainment components that are located downstream of the DPF 18 but upstream of the tailpipe 14 in a manner similar to that schematically shown in FIG. 5. This can be the sole air entrainment component, or as shown in FIG. 6, an addition air entrainment component can be utilized at the tailpipe 14, for example. The air entrainment component 30 for the tailpipe of FIG. 6 is shown in greater detail in FIGS. 4A-4B. The tailpipe 14 in this example is a reverse split Y tail pipe; however the tailpipe could comprise a single tailpipe or separate dual tail pipes could also be utilized. Further, the air entrainment component at the tailpipe location could be the only air entrainment component in the exhaust system if it is determined that an upstream air entrainment component is not needed.

In the example shown in FIGS. 4A-4B, the tailpipe 14 includes first 70 and second 80 pipes each extending between respective first 72, 82 and second 74, 84 pipe ends to form exhaust gas outlets each extending along a respective central axis A. The first pipe ends 72, 82 join together at 90 to form the Y tailpipe which is then connected to an upstream exhaust component or pipe. The second pipe ends 74, 84 each have the non-circular cross-section that extends along a pre-defined pipe length L such as that shown in FIGS. 2A-2C or FIGS. 3A-3C, for example. Each of the first 70 and second 80 pipes includes a separate overlap tube 92 that has a first tube end 94 extending in a downstream direction to define an exhaust system outlet to atmosphere and a second tube end 96 that substantially overlaps the respective second pipe end 74, 84 along the pre-defined pipe length L to form an air gap 98 between the respective pipe 70, 80 and overlap tube 92.

The second tube end 96 has an inner diameter that is greater than an outer diameter of the exhaust pipes 70, 80 at the second pipe ends 72, 82 such that external air is drawn in through an inlet 100 and into the air gap 98. This cooling air mixes with the exhaust gases within the pipes 70, 80 to lower the overall temperature of the exhaust gases exiting the exhaust system.

Thus, the vehicle exhaust system 10 includes at least one air entrainment component 30 that provides an exhaust pipe with a flute feature in combination with an overlap tube positioned over the flute feature. By virtue of the arrangement of the overlap tube and flute feature, air gaps are formed between the flute feature and the overlap tube. The flute feature constricts the exhaust flow to some degree, creating a low pressure zone downstream of the flute feature. Because of this low pressure zone, ambient air is drawn through the air gaps formed between the flute and the overlapping tube, thereby cooling the exhaust before it is emitted from the tailpipe.

Further, the air entrainment component 30 is easily packaged within existing exhaust systems and can be located at various positions along a length of the exhaust system. Due to the gradual taper of the scalloped flutes, there is little contribution to back pressure and there is not an undesirable generation of an air rush. The air entrainment component 30 is more aesthetically pleasing, provides improved packaging, and has lower back-pressure, less air rush, and lower outlet gas temperatures compared to prior designs.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air entrainment component for a vehicle exhaust system comprising:
   an exhaust pipe extending between first and second pipe ends to form an exhaust gas pathway, and wherein said first pipe end is connectable to an upstream exhaust component and said second pipe end has non-circular cross-sections extending along a pre-defined pipe length;
   an overlap tube having a first tube end connectable to a downstream tailpipe and a second tube end that surrounds the second pipe end along the pre-defined pipe length to form at least one air gap between the exhaust pipe and overlap tube through which cooling external air is drawn in to cool heated exhaust gases within the exhaust pipe; and
   wherein the non-circular cross-sections are defined by an outermost peripheral surface portion having a maximum outer dimension that remains constant along the pre-defined pipe length and a variable outer peripheral surface portion having an outer dimension that is less than the maximum outer dimension and which varies along the pre-defined pipe length.

2. The air entrainment component according to claim 1 wherein an outer peripheral surface of the second pipe end includes a plurality of openings to communicate cooling air from the air gap into the exhaust gas pathway.

3. The air entrainment component according to claim 1 wherein the exhaust pipe and overlap tube cooperate to provide a primary entrainment assembly and including at least one additional entrainment assembly comprising the tailpipe and at least one additional overlap tube, the tailpipe having a first end connected to the first tube end and a second end having non-circular cross-sections extending along a pre-defined tailpipe length, and wherein the additional overlap tube surrounds the second end of the tailpipe along the pre-defined tailpipe length to form an air gap between the tailpipe and the additional overlap tube through which cooling external air is drawn in to cool heated exhaust gases exiting the second end of the tailpipe.

4. The air entrainment component according to claim 1 wherein the upstream exhaust component comprises a diesel particulate filter that is at least one of actively or passively regenerated to burn off particulate matter.

5. The air entrainment component according to claim 4 wherein the exhaust pipe and overlap tube cooperate to provide a primary entrainment assembly and including at least one additional entrainment assembly positioned downstream of the primary entrainment assembly.

6. An air entrainment component for a vehicle exhaust system comprising:
   an exhaust pipe extending between first and second pipe ends to form an exhaust gas pathway, and wherein said first pipe end is connectable to an upstream exhaust component and said second pipe end has non-circular cross-sections extending along a pre-defined pipe length, the non-circular cross-sections being defined by an outermost peripheral surface portion having a maximum outer dimension that remains constant along the pre-defined pipe length and a variable outer peripheral surface portion having an outer dimension that is less than the maximum outer dimension and which varies along the pre-defined pipe length; and
   an overlap tube having a first tube end extending in a downstream direction and a second tube end that surrounds the second pipe end along the pre-defined pipe length to form at least one air gap between the exhaust pipe and overlap tube through which cooling external air is drawn in to cool heated exhaust gases within the exhaust pipe.

7. The air entrainment component according to claim 6 wherein the second tube end completely surrounds the second pipe end entirely along the pre-defined pipe length.

8. The air entrainment component according to claim 6 wherein the non-circular cross-sections comprises a fluted section.

9. The air entrainment component according to claim 8 wherein the outermost peripheral surface portion and the variable outer peripheral surface portion of the second pipe end provide a continuous uninterrupted surface along the pre-defined pipe length.

10. The air entrainment component according to claim 8 including a plurality of openings into the exhaust gas pathway, the plurality of openings being formed in areas between the outermost peripheral surface portion and the variable outer peripheral surface portion.

11. The air entrainment component according to claim 8 wherein the first pipe end has a circular cross-section.

12. The air entrainment component according to claim 6 wherein the exhaust pipe and overlap tube cooperate to provide a primary entrainment assembly and including at least one additional entrainment assembly comprising at least one tailpipe and at least one additional overlap tube, the at least one tailpipe having a first end connected to an upstream exhaust component and a second end having non-circular cross-sections extending along a pre-defined tailpipe length, and wherein the additional overlap tube surrounds the second end of the at least one tailpipe along the pre-defined tailpipe length to form at least one air gap between the tailpipe and additional overlap tube through which cooling external air is drawn in to cool heated exhaust gases exiting the second end of the tailpipe, and wherein the primary entrainment assembly is positioned upstream of the at least one additional entrainment assembly.

13. The air entrainment component according to claim 12 wherein the at least one tailpipe comprises first and second tailpipes each having non-circular cross-sections at the second end and each including an overlap tube.

14. The air entrainment component according to claim 6 wherein the overlap tube has an outer peripheral surface that is surrounded by external atmosphere such that the overlap tube provides an outermost surface of the air entrainment component.

15. The air entrainment component according to claim 6 wherein the upstream exhaust component comprises a diesel particulate filter that is at least one of actively or passively regenerated to burn off particulate matter.

16. The air entrainment component according to claim 15 wherein the first tube end is connected to a tailpipe.

17. The air entrainment component according to claim 6 wherein the first pipe end is defined by an outermost diameter that is greater than the maximum outer dimension of the second pipe end to form an air inlet into the air gap between the exhaust pipe and the overlap tube.

18. An air entrainment component for a vehicle exhaust system comprising:
a first exhaust pipe extending between first and second pipe ends to form an exhaust gas pathway, wherein the first pipe end is configured for attachment to an upstream exhaust component and is defined by a first outermost diameter, and wherein the second pipe end has non-circular cross-sections extending along a pre-defined pipe length and is defined by a second outermost diameter that is less than the first outermost diameter to form an air inlet;
wherein the non-circular cross-sections are defined by an outermost peripheral surface portion having a maximum outer dimension that remains constant along the pre-defined pipe length and a variable outer peripheral surface portion having an outer dimension that is less than the maximum outer dimension and which varies along the pre-defined pipe length; and
a second exhaust pipe extending between first and second pipe ends wherein the first pipe end of the second exhaust pipe surrounds the second pipe end of the first exhaust pipe, the first pipe end of the second exhaust pipe being defined by an innermost diameter that is greater than the second outermost diameter of the first exhaust pipe and positioned downstream of the first pipe end of the first exhaust pipe to form at least one air gap between the first and second exhaust pipes through which cooling external air is drawn in through the air inlet to cool heated exhaust gases within the first exhaust pipe.

19. The air entrainment component according to claim 18 wherein the non-circular cross-sections comprise a fluted section.

20. The air entrainment component according to claim 19 wherein an outer peripheral surface around the second pipe end of the first exhaust pipe provides a continuous uninterrupted surface.

21. The air entrainment component according to claim 19 wherein an outer peripheral surface around the second pipe end of the first exhaust pipe includes a plurality of openings into the exhaust gas pathway.

22. The air entrainment component according to claim 18 wherein the first pipe end of the first exhaust pipe has a circular cross-section.

23. The air entrainment component according to claim 18 wherein the first and second exhaust pipes cooperate to provide a primary entrainment assembly and including at least one additional entrainment assembly comprising at least one tailpipe having a first end connected to an upstream exhaust component and a second end having non-circular cross-sections and an overlap pipe surrounding the second end of the at least one tailpipe to form at least one air gap between the at least one tailpipe and the overlap pipe through which cooling external air is drawn in to cool heated exhaust gases exiting the second end of the tailpipe, and wherein the primary entrainment assembly is positioned upstream of the at least one additional entrainment assembly.

24. The air entrainment component according to claim 23 wherein the at least one tailpipe comprises first and second tailpipes each having non-circular cross-sections at the second end and each including an overlap pipe.

25. The air entrainment component according to claim 18 wherein the second exhaust pipe has an outer peripheral surface that is surrounded by external atmosphere such that the second exhaust pipe provides an outermost surface of the air entrainment component.

26. The air entrainment component according to claim 1 wherein the second pipe end of the second exhaust pipe is configured for attachment to a tailpipe.

* * * * *